United States Patent [19]

Blose

[11] Patent Number: 4,600,224
[45] Date of Patent: * Jul. 15, 1986

[54] TUBULAR CONNECTION HAVING A CHEVRON WEDGE THREAD

[75] Inventor: Thomas L. Blose, Houston, Tex.

[73] Assignee: Interlock Technologies Corporation, Houston, Tex.

[ * ] Notice: The portion of the term of this patent subsequent to Jul. 15, 2003 has been disclaimed.

[21] Appl. No.: 565,051

[22] Filed: Dec. 23, 1983

[51] Int. Cl.$^4$ .............................................. F16L 15/00
[52] U.S. Cl. .................................... 285/334; 285/332.4; 285/390; 285/333; 411/411; 411/423
[58] Field of Search ............... 285/333, 334, 355, 390, 285/332.4; 411/411, 423

[56] References Cited

U.S. PATENT DOCUMENTS

| | | |
|---|---|---|
| Re. 30,647 | 6/1981 | Blose . |
| 137,777 | 8/1919 | Pickard . |
| 671,274 | 4/1901 | Fischer . |
| 1,474,375 | 11/1923 | Moore . |
| 2,543,100 | 12/1948 | Engh . |
| 2,893,759 | 7/1959 | Blose . |
| 3,069,960 | 12/1962 | Baubles ........................... 285/334 |
| 3,224,799 | 12/1965 | Blose . |
| 3,572,777 | 5/1969 | Blose . |
| 4,161,332 | 7/1979 | Blose . |
| 4,192,533 | 3/1980 | Blose . |
| 4,244,607 | 1/1981 | Blose . |
| 4,549,754 | 10/1985 | Saunders et al. ................ 285/334 |

FOREIGN PATENT DOCUMENTS

| | | | |
|---|---|---|---|
| 2041135 | 9/1980 | United Kingdom | ............... 411/308 |
| 482577 | 1/1976 | U.S.S.R. | ............... 411/411 |

*Primary Examiner*—Cornelius J. Husar
*Assistant Examiner*—Eric K. Nicholson
*Attorney, Agent, or Firm*—Charles D. Gunter, Jr.

[57] ABSTRACT

A thread form for a tubular connection of the type having a pin member adapted to be made up with a box member to form a pipe joint is shown. The pin member has pin threads with thread crests and thread roots which are adapted to be made up with a mating box member having a complimentary thread structure. The pin thread crests are formed between a stab flank and a load flank of the pin thread. The pin thread has a chevron-shaped load flank for engaging a mating chevron-shaped load flank of the complimentary box member to provide a chevron type interfit between the load bearing load flanks of the pin and box threads. The pin and box threads are also helically structured as a wedge. The chevron type interfit serves to limit the radial movement of the pin threads into the mating box member complimentary thread structure to control the radial make up of the pipe joint.

8 Claims, 6 Drawing Figures

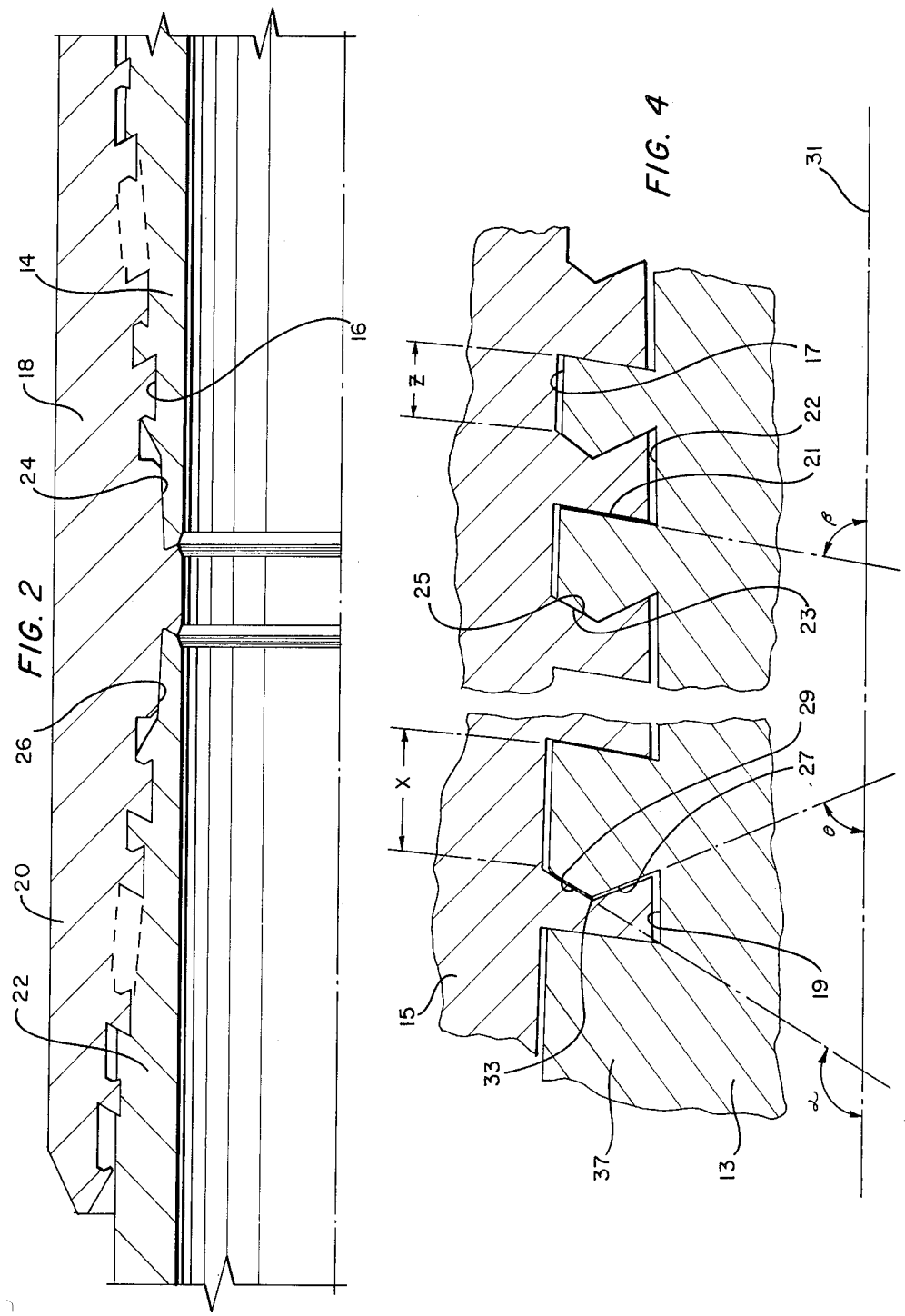

TUBULAR CONNECTION HAVING A CHEVRON WEDGE THREAD

BACKGROUND OF THE INVENTION

This application is related to the co-pending application of Thomas L. Blose, entitled TUBULAR CONNECTION HAVING A PARALLEL CHEVRON THREAD, application Ser. No. 06/565119 filed concurrently herewith.

The present invention relates generally to a thread form for a tubular connection of the type used in tubing casing and drill pipe, such as is used in gas and oil wells and, specifically to such a thread form designed with a chevron-shaped wedge thread.

With oil and gas wells being drilled to greater depths and in a greater variety of geographic locations than ever before, there exists a need for a tubular connection for pipe joints which will be capable of performing its sealing function under all conditions and under all levels of operating stress and strain. One object in designing such all purpose threads is to design a thread form that will have high torsional resistance without inducing axial or radial stresses into the tubular connection upon power make up of the joint. Tubular connections with high torsional resistance resist additional make up in the pipe joints when in service in the well bore, making it easier to break out the joints if this becomes necessary. By reducing axial or radial stresses in the threaded connection, a sounder connection is provided which is able to withstand a greater level of operating stress and strain.

In order to achieve the object of providing high torsional resistance in the threaded connection, the concept of a wedge thread was devised. The first wedge threads had low positive angle thread flanks on threads which were helically structured as a wedge. The theory was that when mating threads of helically wedged configuration were screwed together, as the wedging takes place, the torisional resistance of the connection greatly increases. Further advance or make up in the threaded connection could then only occur if the material of the threads themselves yielded due to the compressive or squeezing action of the load bearing faces of the threads. The wedge thread, if properly designed, can also help prevent inducing high axial or radial stresses during makeup of the connection by avoiding the necessity of "jack screwing" against a shoulder in the joint to absorb torque and limit make up. Unfortunately, machining technology has not until recent years been sufficiently advanced to accomplish the task of making a properly designed wedge thread on a practical basis for tubular manufacturing.

Another object in designing an all purpose thread form for well tubular connections is to provide a thread structure with a controlled clearance between mating crests and roots of the interengaged threads to prevent hydraulic pressure buildup caused by entrapped lubricant between the thread crests and roots. Entrapped lubricant has a tendency to lower breakout torque in a tubular connection, which is considered undesirable in well tubular connections.

Prior thread designs for well tubular connections have all been deficient in one or more of the above respects.

SUMMARY OF THE INVENTION

It is the object of the present invention to control radial make up of the threaded connection by a special thread structuring where the radial movement of a thread into a mating thread groove will be restricted by a chevron type interfit between two load bearing thread surfaces of the threaded connection instead of relying upon thread width alone. By controlling the radial interfit between mating threads, lubricant entrapment can be controlled.

The chevron wedge thread design of the invention also allows a balance of radial stresses upon assembly. Due to the helical wedging action of the threads and the balance of radial components from the forces on the stab and load bearing surfaces of the threads, there will be no radial component inducing stresses in either the pin or box number.

The thread form of the invention is intended for use in a tubular connection of the type having a pin member adapted to be made up with a box member to form a pipe joint. The pin member has pin threads with thread crests and thread roots which are adapted to be made up with a mating box member having a complimentary thread structure. The pin thread crests are formed between a stab flank and a load flank of the pin thread. The pin thread has a chevron-shaped load flank for engaging a mating chevron-shaped load flank of a complimentary box member to provide a chevron type interfit between the load bearing thread flanks of the pin and box threads.

The pin and box threads are helical wedge threads having progressively changing axial widths. The axial thread width of the pin member progressively decreases in the direction of the mouth of the pin member over the length of the thread structure. The axial thread width of the box member progressively decreases in the opposite direction, wherein the pin and box members in the fully made-up condition have a mutually wedging interfit.

Additional objects, features and advantages will be apparent in the written description which follows.

BRIEF DESCRIPTION OF THE DRAWINGS

FIG. 2 is a partial, side cross-sectional view of a tapered connection with the thread form of the invention.

FIG. 4 is an isolated, close-up view of the thread form of the invention in the fully made up position.

DETAILED DESCRIPTION OF THE INVENTION

Figure 1:
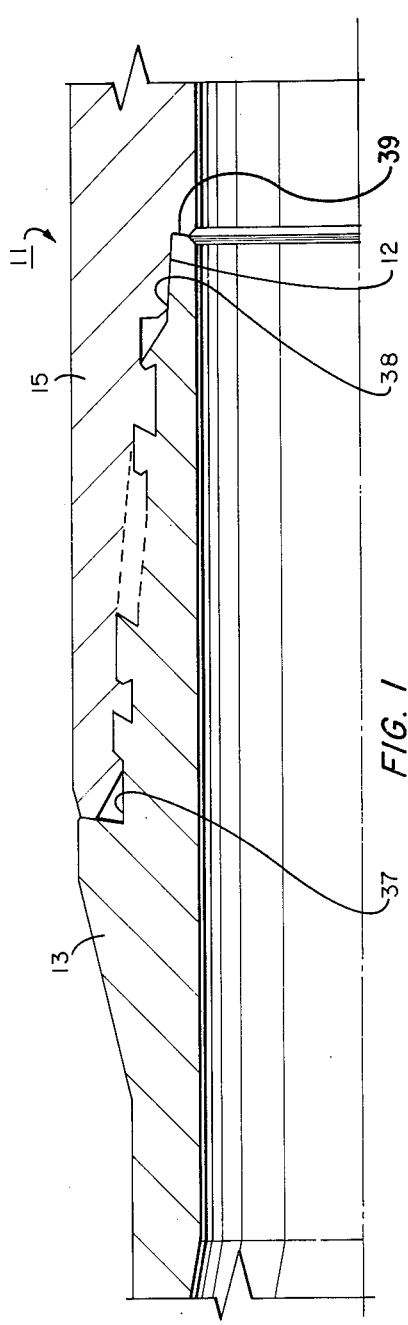
FIG. 1 is a partial, side cross-sectional view of a tapered connection with the thread form of the invention.
Figure 3:
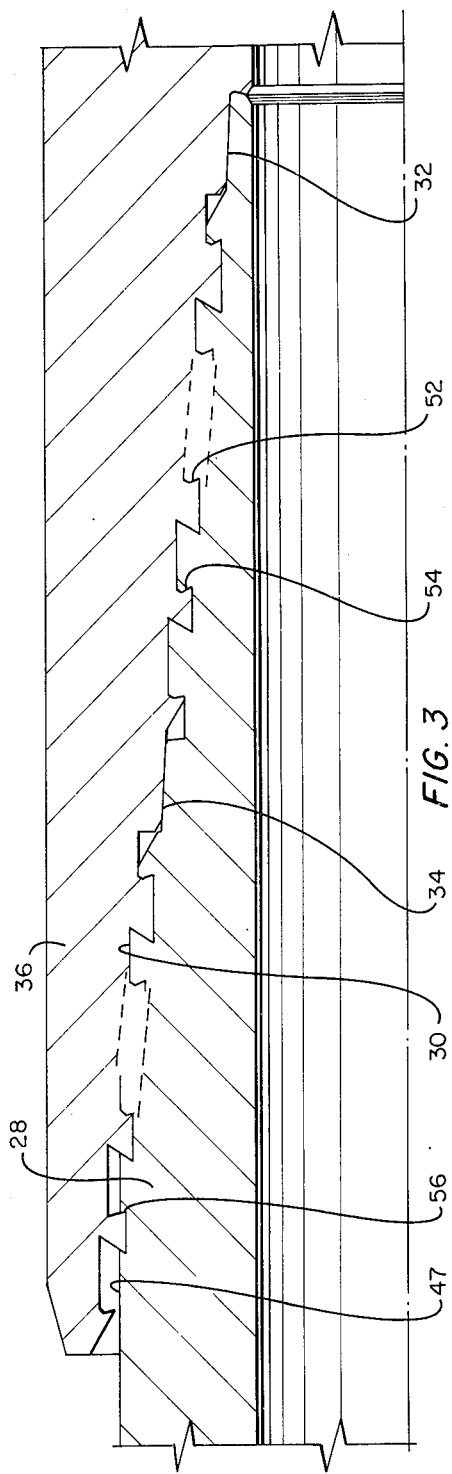
FIG. 3 is a partial, side cross-sectional view of a tapered connection with the thread form of the invention.

FIGS. 1–3 show three types of tubular connections which feature the thread form of the invention. FIG. 1 shows a tubular connection, designated generally as 11, which has a male or pin member 13 adapted to be made up with a female or box member 15 to form a pipe joint. By the term "pipe" is meant casing, tubing and pipe such as that used in the oil and gas well environment. The particular connection shown in FIG. 1 is a single step, axially tapered connection with a metal-to-metal seal at the area designated as 12.

FIG. 2 is another connection employing the thread form of the invention. The connection shown in FIG. 2 is a coupled, axially tapered connection having a pin member 14 with external threads 16 which are matingly engaged within the threaded end of a coupling 18. Coupling 18 also has a threaded end 20 for matingly engaging an externally threaded member 22. A metal-to-metal seal exists at the areas designated 24, 26.

FIG. 3 is another connection employing the thread form of the invention. The thread form in FIG. 3 has a pin member 28 with stepped external threads 30. The pin member 28 is adapted to be threadedly engaged within the mating internal threads of a box member 36 and forms a metal-to-metal seal between the thread steps at the areas designated as 32, 34.

Although only three tubular connections embodying the thread form of the invention are shown, it should be understood that other types of connections can be made using the thread form of the invention. For example, the connections can be upset or non-upset and can be tapered or "cylindrical", non-tapered connections.

FIG. 4 shows the thread form of the invention in greater detail. As shown in FIG. 4, the pin member 13 has pin threads with thread crests 17 and thread roots 19. The crests 17 and roots 19 of the pin member 13 are adapted to be made up with a mating box member 15 having a complimentary thread structure. The pin thread crests 17 are formed between a stab flank 21 and a load flank 23 of the pin thread.

The pin thread load flank 23 is a double-sloping, chevron-shaped load flank which is adapted for engaging a mating chevron-shaped load flank 25 of the complimentary box member 15 to provide a chevron type interfit between the load bearing thread flanks of the pin and box threads. As shown in FIG. 4, the pin thread chevron-shaped load flank 23 is made up of an inner wall portion 27 and an intersecting outer wall portion 29. The inner wall portion 27 forms a negative angle theta with respect to the longitudinal axis 31 of the tubular connection. By "negative" angle is meant that the angle theta formed between the inner wall portion 27 and the adjacent thread root 19 is an acute angle whereby the inner wall portion 27 flares inwardly toward the thread root 19. As shown in FIG. 4, the outer wall portion 29 of the pin load flank forms a positive or obtuse angle alpha with respect to the longitudinal axis 31 whereby the outer wall portion 29 flares outwardly from the point of intersection 33 with the inner wall portion 27 of the thread flank.

The pin thread stab flank 21, as shown in FIG. 4, forms a negative or acute angle beta with respect to the longitudinal axis 31 and stab flank 21 flares inwardly in the direction of the adjacent pin thread root 22. Stab flank 21 and the load flank inner wall portion 27 are non-parallel. The thread crests 17 and roots 19 are parallel to the longitudinal axis 31 of the tubular connection 11 to prevent cross-threading.

Both the pin and box threads are helical wedge threads and thus have progressively changing axial width along the helical length thereof. In other words, viewing the pin member 13 in FIGS. 1 and 4, it can be seen that the thread width of each successive thread progressively decreases from the outer extent 37 of the pin member along the helical length thereof to the inner extent 38 adjacent the mouth 39 of the pin member 13. Thus, the thread width of the pin member 13 at "X" is greater than the thread width "Z" in FIG. 4. The axial thread width of the box member 15 progressively decreases in the opposite direction. The progressively changing axial width of the pin and box threads provides a vertically wedging interfit to limit axial make up of the tubular conneciton.

The threaded tubular connection can be tapered, although this is not a requirement of the present invention. By "tapered" is meant that the threads are disposed on a taper with the pin member having vanishing threads on non-upset pipe and either vanishing or full depth threads on upset pipe, while the box member has in both cases full threads. With reference to FIG. 3, the threads of the pin 28 and box 36 are disposed on a taper with the box member 36 being provided with fully cut threads throughout the entire length of the threaded portion. The pin member 28 is provided with similar threads, but these threads gradually diminish in depth as the outer extent or larger diameter end 47 of the thread is approached. The portion of the thread length which becomes progressively shallower in depth is called the vanishing thread or, alternatively, the runout thread.

Referring to FIG. 3, it is important to note that the pin chevron-shaped flanks, as at 52, 54, are arranged to form an apex which points to the left when viewing FIG. 3, instead of being oppositely arranged to form an apex which would point to the right. This arrangement is important in the case of vanishing threads because this design allows the box member 36 to "catch" or hold onto the pin vanishing threads, as at 56, under tensile loading, thereby increasing the tensile capacity of the connection. The reverse arrangement of the chevron-shaped flanks would tend to cause the members to "push-off" or disengage under tensile loading.

Figure 6:
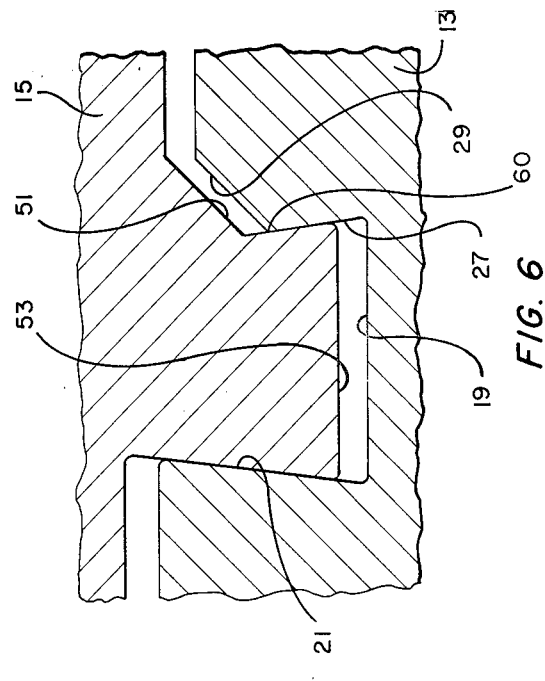
FIG. 6 is an isolated close-up view of the thread form of the invention during assembly.
Figure 5:
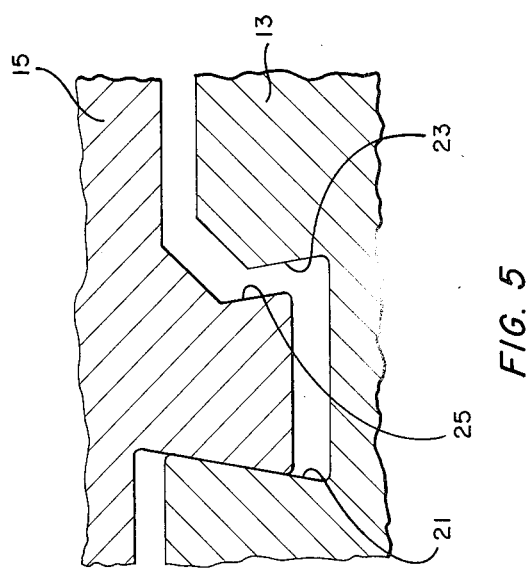
FIG. 5 is an isolated, close-up view of the thread form of the invention during assembly.

The operation of the invention will now be described. FIG. 5 shows the thread form of the invention in partial thread engagement as the connection is being assembled prior to any contact with any portion of the load flank 23 of the pin 13. The first contact is made with the stab flank 21. FIG. 6 shows the condition of the thread form as make up continues with the stab flank 21 engaged and, subsequently, the inner wall portion 27 of the chevron load flank. Under these conditions, the radial stresses from the component forces of the bearing surfaces 21 and 27 cause the threads of the box member 15 to move inward or radially toward the roots 19 of the pin member 13 or vice-versa.

This movement continues until the outer wall portion 29 of the pin member 13 and the inner wall portion 51 of the box chevron-shaped load flanks have made contact, at which time all of the chevron load flank contact area is engaged. When the surfaces 29, 51 make contact, radial movement of the box threads into the pin thread roots will stop. The movement will stop even though the box member crests 53 and pin member roots 19 have not made contact (see FIG. 4). Now, if additional torque is applied, the balance of forces on the contact surfaces of the thread flanks (21, 27, 29 for pin member 13) will stop further radial movement of the threads of the box member 15 into the pin grooves and axial squeezing of the threads between the stab and load flanks will occur stopping further make up.

The squeezing of the threads acts much like the priciple of disc brake reaction. Due to the helical wedging action of the threads and the balance of radial components from the forces on the stab and load bearing surfaces, there will be no radial component inducing stresses in either the pin or box member. The more torque that is applied, the tighter the "disc brake" squeeze that occurs between mating threads. The result is a lack of radial or axial stresses in either member from further applied torque.

FIG. 4 demonstrates another beneficial feature of the chevron-shaped thread form in that the surface 29 of the pin member 13 will act as a buffer zone to prevent "hooking" or "hanging up" of the pin threads on the box threads during disassembly as the two members are being disengaged. If the angle alpha shown in FIG. 4 were extended to a negative angle, the load flank of the pin member 13 would have more of a tendency to catch on the threads of the box member 15.

Although the invention has been described with respect to "tapered" connections, the chevron-shaped wedge thread design can also be used in non-tapered or "cylindrical" connection. By "non-tapered" is meant that the threads are parallel throughout the thread length to the longitudinal axis of the pipe. In cylindrical connections one difference exists, however, in that there is no inherent radial engagement that takes place upon makeup as is the case in tapered connections. In cylindrical connections, because the threads are parallel throughout the thread length, the threads must have radial clearance between mating threads to be "free-running" and permit assembly of the connection by rotational engagement.

The amount of radial clearance, as at 19, 53 in FIG. 6, is determined by the location of the chevron apex 60 between the two thread load bearing flanks 29, 51. By proper location of the apex 60 and properly determining the angle formed by the intersection of flanks 27, 29, the clearance space can be controlled without relying solely upon thread width as was the case in certain prior wedge thread designs.

An invention has been provided with significant advantages. Axial make up of the threaded connection of the invention can be controlled without abutting a shoulder on the joint by the wedging action of the threads themselves. Radial make up can be controlled by the special thread structuring where the radical movement of the thread making up into a mating thread groove will be restricted by a chevron-shaped interfit between the two load bearing thread flanks. By controlling the radial interfit between mating threads, lubricant entrapment can be controlled. Thus, for light lubricants, a small clearance can be provided. For heavy lubricants, a larger relative clearance can be provided. The chevron interlocking of the load flanks of the threaded connection also causes balanced stresses when the threads wedge upon make up. The load flank areas (23, 25 in FIG. 4) provide a bearing interfit which causes stresses which try to expand the box member and compress the pin member while the inner wall portion (27 for the pin) and the opposite stab flanks (21 for the pin) of the threaded connection are inducing resultant radial stresses which tend to pull the box and pin members together.

By properly designing the angles alpha, beta and theta, it is possible to balance the radial stresses caused by the torque bearing loads with opposing stresses caused by the threads wedging between the stab and load flanks. There is thus created a balance of stresses such that radial forces cannot occur when the crests and roots of mating threads are in clearance as shown in FIG. 4. The chevron wedge thread of the invention thus allows a balance of radial stresses upon assembly.

While the invention has been shown in only one of its forms, it is not thus limited but is susceptible to various changes and modifications without departing from the spirit thereof.

I claim:

1. A thread form for a tubular connection of the type having a pin member adapted to be made up with a box member to form a pipe joint, comprising:

a pin member having pin threads with thread crests and thread roots which are adapted to be made up with a mating box member having a complimentary thread structure, said pin thread crests being formed between a stab flank and a load flank of said pin thread;

said pin thread having a chevron-shaped load flank made up of an inner wall portion and an intersecting outer wall portion which together form a double sloped flank for engaging a mating chevron-shaped load flank of said complimentary box member to provide a chevron type interfit between the load bearing thread flanks of said pin and box threads, the respective stab flanks of the pin threads and box threads being formed as a single, uniformly sloped flank extending from thread crest to thread root, said chevron type interfit serving to limit the radial movement of said pin threads into said mating box member complimentary thread structure to control the radial make up of said pipe joint; and wherein said pin and box threads are helically structured as a wedge.

2. A thread form for a tubular connection of the type having a pin member terminating in a pin mouth, the pin member being adapted to be received within the mouth of a box member to form a pipe joint, comprising:

a pin member having pin threads with thread crests and thread roots which are adapted to be made up with a mating box member having a complimentary thread structure, said pin thread crests being formed between a stab flank and a load flank of said pin thread;

said pin thread having a chevron-shaped load flank made up of an inner wall portion and an intersecting outer wall portion which together form a double sloped flank for engaging a mating chevron-shaped load flank of said complimentary box member to provide a chevron type interfit between the load bearing thread flanks of said pin and box threads, the respective stab flanks of the pin threads and box threads being formed as a single, uniformly sloped flank extending from thread crest to thread root said chevron type interfit serving to limit the radial movement of said pin threads into said mating box member complimentary thread structure to control the radial make up of said pipe joint; and wherein said pin and box threads have progressively changing axial width, said axial thread width progressively decreasing toward the mouth of said pin member over the length of said thread, structure, an the axial thread width of the box member progressively decreasing in the opposite direction, wherein said pin and box members in the fully made up condition have a mutually wedging interfit to limit the axial make up of said pipe joint.

3. A thread from for a tubular connection of the type having a pin member terminating in a pin mouth, the pin member being adapted to be received within the mouth of a box member to form a pipe joint, comprising:

a pin member having pin threads with thread crests and thread roots which are adapted to be made up with a mating box member having a complimentary thread structure said pin thread crests being formed between a stab flank and a load flank of said pin thread;

said pin thread having a chevron-shaped load flank for engaging a mating chevron-shaped load flank of said complimentary box member to provide a chevron type interfit between the load bearing thread flanks of said pin and box threads, said chevron type interfit serving to limit the radial movement of said pin threads into said mating box member complimentary thread structure to control the radial make up of said pipe joint;

wherein said pin and box threads have progressively changing axial width, said axial thread width progressively decreasing toward the mouth of said pin member over the length of said thread structure, and the axial thread width of the box member progressively decreasing in the opposite direction, wherein said pin and box members in the fully made up condition have a mutually wedging interfit to limit the axial make up of said pipe joint; and wherein said pin thread stab flank forms an acute angle beta with respect to the longitudinal axis of the tubular connection, whereby the stab flank of said pin thread flares inwardly in the direction of said adjacent pin thread root.

4. A thread form for a tubular connection of the type having a pin member terminating in a pin mouth, the pin member being adapted to be received within the mouth of a box member to form a pipe joint, comprising:

a pin member having pin threads with thread crests and thread roots which are adapted to be made up with a mating box member having a complimentary thread structure, said pin thread crests being formed between a stab flank and a load flank of said pin thread;

said pin thread having a chevron-shaped load flank for engaging a mating chevron-shaped load flank of said complimentary box member to provide a chevron type interfit between the load bearing thread flanks of said pin and box threads, said chevron type interfit serving to limit the radial movement of said pin threads into said mating box member complimentary thread structure to control the radial make up of said pipe joint;

wherein said pin and box threads have progressively changing axial width, said axial thread width progressively decreasing toward the mouth of said pin member over the length of said thread structure and the axial thread width of the box member progressively decreasing in the opposite direction, wherein said pin a box members in the fully made up condition have a mutally wedging interfit to limit the axial make up of said pipe joint;

wherein said pin thread stab flank forms an acute angle beta with respect to the longitudinal axis of said tubular connection, whereby the stab flank of said pin thread flares inwardly in the direction of said adjacent pin thread root; and wherein said pin thread chevron-shaped load flank is made up of an inner wall portion and an intersecting outer wall portion, said inner wall portion forming an acute angle theta with respect to said longitudinal axis of said tubular connection whereby said inner wall portion flares inwardly toward said thread root and wherein said outer wall portion forms an obtuse angle alpha with respect to said longitudinal axis, whereby said outer wall portion flares outwardly from said point of intersection with said inner wall portion and from said adjacent thread root.

5. The thread form of claim 4, wherein the angles alpha, beta and theta are selected so that upon make up, the pin outer wall portion contacts the complimentary box inner wall portion of the chevron interfit to restrict further movement of the pin thread crests into the box thread roots to limit radial make up of the pipe joint.

6. The thread form of claim 5, wherein the angles alpha, beta and theta are selected so that the radial stresses acting to pull the box and pin members together and induce compressive stresses in the box and tensile stresses in the pin caused by the interfit of the box and pin member stab flanks and load flank wall portions are balanced against the radial stresses acting to expand the box member and compress the pin member caused by the interfit of the box and pin member chevron-shaped load flanks to provide a balance of radial stresses in the pipe joint upon make up.

7. The thread form of claim 6, wherein the angles alpha, beta and theta are selected so that a space exits between the thread crests and thread roots of the pin and box members when the chevron-shaped load flanks of the pin threads and box threads are engaged.

8. The thread form of claim 7, wherein said pin and box members are axially tapered.

* * * * *